Aug. 16, 1927.

J. F. NEVIUS 1,639,612

LOCKING DEVICE FOR MOTOR CONTROLS

Filed March 17, 1926

WITNESSES

INVENTOR
JOHN F. NEVIUS
BY
ATTORNEYS

Patented Aug. 16, 1927.

1,639,612

UNITED STATES PATENT OFFICE.

JOHN F. NEVIUS, OF NEW YORK, N. Y.

LOCKING DEVICE FOR MOTOR CONTROLS.

Application filed March 17, 1926. Serial No. 95,241.

This invention relates to locking devices and has especial reference to a locking device applicable for rendering motor control parts such as the spark and throttle levers of an internal combustion motor or engine immovable.

Some of the objects of the present invention are, to provide a comparatively simple, inexpensive, thoroughly efficient and effectual device of the indicated character, capable of being readily applied to lock motor control parts against movement; and to provide a device of the indicated character which may be set in place by virtue of structural features which combine with other features of the controlling mechanism with which the device is associated to hold the controlling levers of said mechanism against movement without requiring securement of the device other than its mere association with the parts to be locked against movement and fixed members associated therewith.

The nature of the present invention and its distinguishing features and advantages will appear when the following specification is read in connection with the accompanying drawings, in which—

Figure 3:
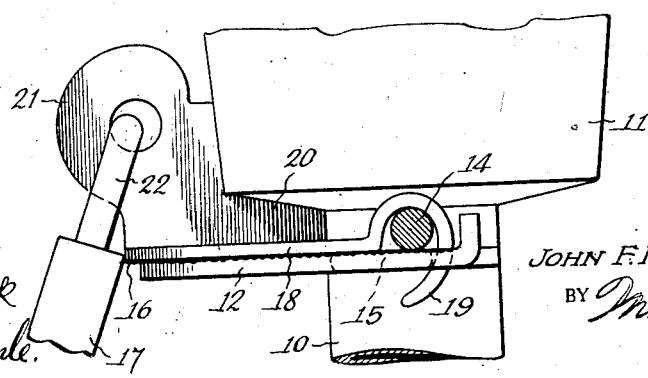
Fig. 3 is a side elevation showing the application of the locking device, one of the control levers locked against movement being shown in section.

The locking device of the present invention is especially adapted for use in conjunction with the motor control and steering assemblage of a Ford automobile. The steering gear of the assemblage includes a steering gear tubing 10, and a housing 11 which houses the planetary gearing. The motor control mechanism of the assemblage, includes a quadrant 12, a spark lever 13, and a throttle lever 14. The quadrant 12 is connected to the steering gear tubing 10 by a spider which includes members 15 through which the lead rods respectively of the spark lever and throttle lever extend. The quadrant 12 is arranged some distance below the housing 11 as shown most clearly in Fig. 3.

Figure 1:
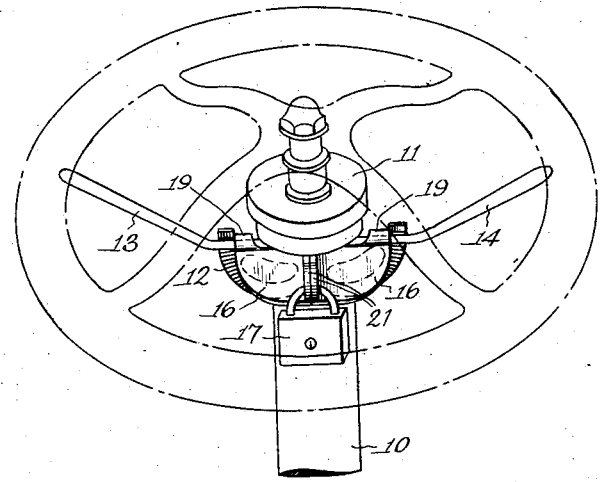
Figure 1 is a perspective view of the locking device in position upon parts of the steering gear and in connection with the spark lever and throttle lever of an automobile.
Figure 2:
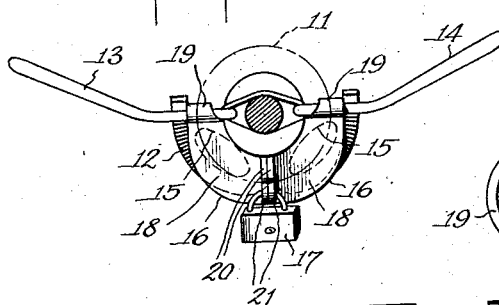
Fig. 2 is a sectional plan view illustrating the application of the locking device of the present invention.
Figure 4:
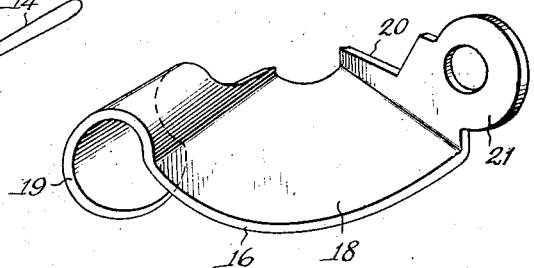
Fig. 4 is a perspective view of one of the two similar companion locking parts of the device.

The locking device of the present invention is capable of being associated with the parts hereinbefore mentioned. The locking device of the present invention, generally stated comprises two companion parts 16, and a key operated lock 17. The parts 16 are identical in construction. Each part, in the present instance is stamped, bent and formed to provide a main substantially flat arcuate portion 18, a hook 19, a bench 20, and an apertured lug 21. The construction and manner of disposition of the hook, bench and apertured lug 21 of each of the parts 16 is such, that when the parts 16 are brought together the hooks 19 will be engaged respectively over the spark and throttle levers and in engagement with the members 15 of the quadrant spider, the benches 20 will be engaged under the housing 11, and the apertured lugs 21 will be brought together so as to accommodate the bail 22 of the lock 17 as shown most clearly in Figs. 1 and 2. Under this arrangement, the spark lever 13 and the throttle lever 14 will be held against movement with the "spark" and "gas" cut off. In this way the automobile will be locked against theft.

From the foregoing it will be apparent that the device of the present invention is comparatively simple, inexpensive, capable of being readily applied for setting up locking action and removed to unlock the motor controls, and that it is not necessary to fasten or attach the parts 16 but to merely associate them with parts of the steering and control assemblage of the automobile, the structural features of which mutually combine with the structural features of the parts 16.

I claim:

1. The combination with a control assemblage including a quadrant, movable control levers, and a housing; of a locking device comprising companion parts each adapted to rest upon the quadrant, each of said parts having a hook engageable with one of the control levers and a portion of the quadrant, each of said parts having a portion engageable with the under side of the housing, each of said parts having an apertured lug, and key actuated locking means releasably engageable with the apertured lugs.

2. A device for controlling the motor controls of a controlling assemblage, said device comprising two similar parts, each of said parts consisting of a single piece of material stamped, bent and formed to provide an arcuate flat plate, a hook, a bench, and an apertured lug, the hook of each part adapted to engage one of the controls and a fixed portion of the assemblage, the flat plate of each part adapted to rest on one part of the assemblage with its bench against the under side of another fixed part of the assemblage, and locking means releasably engageable with the apertured lugs for locking said parts together.

JOHN F. NEVIUS.